United States Patent [19]
Noland

[11] Patent Number: 5,270,136
[45] Date of Patent: Dec. 14, 1993

[54] ACID-NEUTRALIZING BATTERY MAT

[76] Inventor: E. Bruce Noland, 205 Wildman St., Leesburg, Va. 22075

[21] Appl. No.: 873,103

[22] Filed: Apr. 24, 1992

[51] Int. Cl.$^5$ .............................................. H01M 2/02
[52] U.S. Cl. ...................... 429/175; 429/48; 429/121; 429/176; 429/186; 180/68.5
[58] Field of Search ................. 429/48, 121, 175, 176, 429/186; 180/68.5

[56] References Cited

U.S. PATENT DOCUMENTS

| | | | |
|---|---|---|---|
| 1,671,016 | 5/1928 | Dewey. | |
| 1,796,156 | 3/1931 | McMorris. | |
| 2,159,854 | 5/1939 | Jourdan et al. | |
| 2,564,810 | 8/1951 | Martin et al. | |
| 3,224,906 | 12/1965 | Deibel et al. | |
| 3,661,642 | 5/1972 | Pisaturo. | |
| 3,825,447 | 7/1974 | Kraals. | |
| 4,523,658 | 6/1985 | Maki | 180/68.5 |
| 4,936,409 | 6/1990 | Nix et al. | 180/68.5 |

FOREIGN PATENT DOCUMENTS 0128777  7/1984  Japan .................................... 429/48

Primary Examiner—Ellen M. McAvoy
Assistant Examiner—M. Nuzzolillo
Attorney, Agent, or Firm—Birch, Stewart, Kolasch & Birch

[57] ABSTRACT

An acid-neutralizing battery mat is produced that is useful in preventing or reducing corrosion caused by leaking batteries. The mat is placed underneath a wet cell storage battery and is designed to absorb and neutralize acid which may escape from the battery. The mat is comprised of a porous fibrous base material of needled polypropylene felt which is impregnated with an alkaline substance and a polymer binder. The mat has a sufficient absorbency so that as the acid reaches the mat, it is disbursed throughout a wide area and neutralized by the alkaline substance. The dimensions of the mat are such that a portion of the mat extends beyond at least one bottom edge of the battery. The mat not only protects against acid induced corrosion but also protects the environment from acid contaminants.

19 Claims, 1 Drawing Sheet

ACID-NEUTRALIZING BATTERY MAT

FIELD OF THE INVENTION

The present invention relates to an acid neutralizing mat for use in absorbing and neutralizing battery acid.

BACKGROUND OF THE INVENTION

Conventional wet cell storage batteries contain acid electrolytes such as sulfuric acid. A long standing problem with such batteries is the tendency of the acid contained therein to leak out or condense on the battery surfaces, thereby causing corrosion of the battery terminals, battery cables, battery holder or support, and any other metallic parts in the vicinity.

In order to combat this problem numerous proposals have been set forth. For example, U.S. Pat. No. 3,661,642 to Pisturo discloses a method for cleaning corroded battery terminals and the like by applying an aqueous solution of pure fruit dye, sucrose, sodium bicarbonate, benzoate of soda and vitamin D3 to the battery terminals followed by flushing with water. However, such a method is useful only after corrosion has manifested.

In order to prevent the formation of corrosion, U.S. Pat. No. 2,564,810 to Martin et al discloses a battery terminal cover that protects the terminals and the battery clamps. The cover contains an interior pad, made of fabric or porous material such as felt, that is impregnated with bicarbonate of soda or other suitable chemical. This interior pad serves to neutralize the escaped acid near the terminals.

Similarly, U.S. Pat. No. 3,224,906 to Diebel discloses an acid-resistant material for use in protecting battery terminals and the like from corrosion. In this method, a material, which is porous and has been impregnated with a basic substance, is placed around the battery terminals and/or the periphery of the outer top edge of the battery. As the escaped acid migrates toward the battery terminals or the edge of the battery, it encounters the impregnated material and is neutralized; thus protecting the various metallic parts. In one embodiment, compressed glass fibers are impregnated with a solution of natural rubber latex and sodium carbonate. After drying, the material can then be cut into washers, for use on the battery posts, or into strips, for use around the top edges.

A slightly different approach for protecting metallic parts around the battery calls for encasing the entire battery with a battery cover, as is shown in U.S. Pat. No. 3,825,447 to Kraals. The primary object of this method is to prevent corrosive damage that could be caused by acidic emanations from the battery through shear containment. The battery cover is an enclosed container having sidewalls, a bottom and a top wall with a closure device thereon. The battery cables are connected to the battery terminals through two openings in the sidewalls. The cover is then sealed to prevent the escape of any vapors or acid from the interior of the cover. The cover is made of polyethylene which does note serve to neutralize the escaped acid.

Of the various methods discussed above, none have been completely effective and convenient in protecting metallic parts from the corrosive effects of battery acid. While the protective material of Diebel et al. is useful for neutralizing acid present on the top surface of the battery, any acid passing the protective border around the upper edge of the battery can still leak to the battery holder or other parts thereof and cause substantial damage. Moreover, such a protective border offers no protection from acid that diffuse or leaks through the sides or bottom of the battery. A battery cover is effective but inconvenient since it is difficult to use and restricts easy access to the battery itself. Moreover, such devices are potentially hazardous as they contain trapped acid which may leak out during servicing or replacement.

SUMMARY OF THE INVENTION

Accordingly, an object of the present invention is to provide an acid neutralizing battery mat that is both effective in preventing acid migration and easy to use.

Another object of the present invention is to protect the environment from battery acid emissions.

Another object of the present invention is to provide a method for producing an acid neutralizing battery mat.

A further object of the present invention is to provide a battery holder that reduces or prevents corrosion caused by battery acid to the holder and surrounding areas.

These and other objects of the present invention are accomplished by an acid-neutralizing battery mat for placement underneath a battery; comprising:

a sheet of needled polypropylene felt impregnated with an alkaline substance, and a polymer binder.

Additionally, the present invention relates to an acid-neutralizing battery holder, comprising:

a wet-cell storage battery having a top surface, sidewalls and a bottom surface;

means for holding said battery comprising a support surface subjacent to said bottom surface of said battery; and an acid-neutralizing mat interposed between said support surface and said bottom surface of said battery;

wherein said mat comprises:

a sheet of needled polypropylene felt impregnated with an alkaline substance and a polymer binder;

said mat being of sufficient length and width so as to extend a pre-determined distance beyond at least one of said sidewalls of said battery.

BRIEF DESCRIPTION OF DRAWINGS

The above and other objects and features of the invention will become apparent from the following detailed description given in connection with the accompanying drawings which form a part of this specification and in which.

DETAILED DESCRIPTION OF THE INVENTION

The present invention is directed to an acid-neutralizing battery mat for use underneath a wet cell storage battery. The mat functions to absorb and neutralize battery acid which may escape from the storage battery and thereby prevent corrosion of the battery holder and vicinity. The mat is comprised of a porous, fibrous base sheet made of needled polypropylene felt that has been impregnated with an alkaline substance and a polymer binder. In practice, when acid leaks from the top or sides of a battery, it travels down the side of the battery and encounters the mat. The acid is absorbed into the mat wherein upon reaction with the alkaline substance, it is neutralized. Because the acid is normally captured near the bottom edges of the battery, the mat is cut to a predetermined size sufficient to extend outwardly beyond at least one of the bottom surface edges of the battery. Thus, for a given battery the length and width of the mat are formed so as to extend in at least one direction, that is beyond one battery sidewall, a predetermined distance beyond the battery's bottom surface. Preferably this predetermined distance or extension is at least 0.125 inches, more preferably 0.125 to 2.0 inches. It is also preferred that the mat extend beyond the bottom surface of the battery in all directions, that is, beyond each sidewall or bottom edge of the battery.

The battery mat can be used in conjunction with any wet cell storage battery and in a variety of applications including automobiles, boats, airplanes, golf carts, and any other battery containing device wherein a reduction in battery induced corrosion is desired. Indeed, the mat not only protects the battery holder, but also aids in reducing the overall risk of acid induced corrosion for the metal parts in the entire vicinity of the mat. This is because the mat acts as an acid sink, trapping and neutralizing the acid before it can evaporate and spread as a gas to other surfaces. Thus, in an automobile for instance, the mat protects the battery holder as well as the shock towers, wheel wells, and other metal parts located under the hood.

In addition to reducing or preventing corrosion, the battery mat also protects the environment by trapping escaped battery acid before it evaporates into the atmosphere. Thus, the mat is advantageous, from an environmental view point, even when used in non-metallic surroundings.

The invention is further illustrated with reference to FIGS. 1-3.

Figure 1:
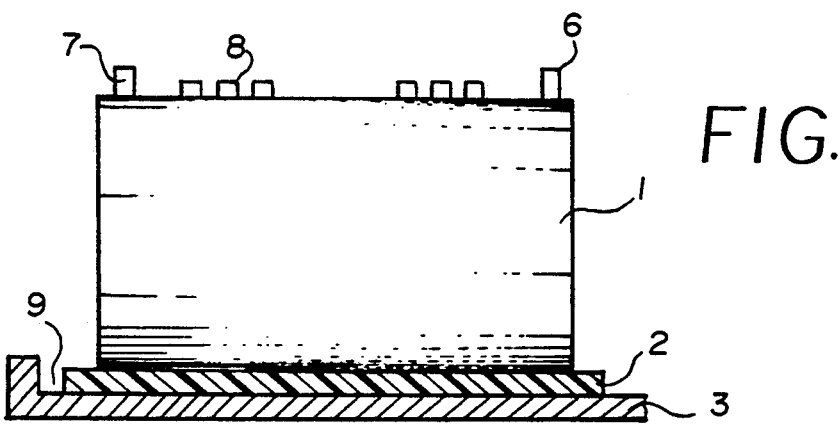
FIG. 1 is a front view of a conventional storage battery as used with a preferred embodiment of the present invention.

FIG. 1 shows a conventional storage battery 1 as used with the acid-neutralizing battery mat 2 and metallic battery holder 3 having support surface 9. The conventional storage battery 1 has two metallic terminals 6 and 7 on the upper surface of the battery for connecting it with a device to be powered. In addition to the two terminals, there is also a plurality of ports 8 on the upper surface of the battery for allowing an operator to fill the battery with water, sulfuric acid or other elements necessary for the battery to operate. Acid can escape by leaking through the plurality of ports 8 or condensing on the top and side surfaces of the battery 1. When the acid leaks or condenses on the top surface of the battery, battery movement may urge the acid towards the side of the battery and ultimately down toward its bottom edge. Without the mat 2 isolating the battery 1 from the holder 3, the acid would encounter the metallic tray and, over time, corrosion would result.

It should be noted that the mat serves as both a chemical barrier and a physical barrier in protecting the holder 3 from the acid. Thus, even if a sufficiently large quantity of acid is absorbed by the mat so as to react all of the alkaline material, the mat will continue to protect the holder from corrosion by trapping and holding escaped battery acid.

Figure 2:
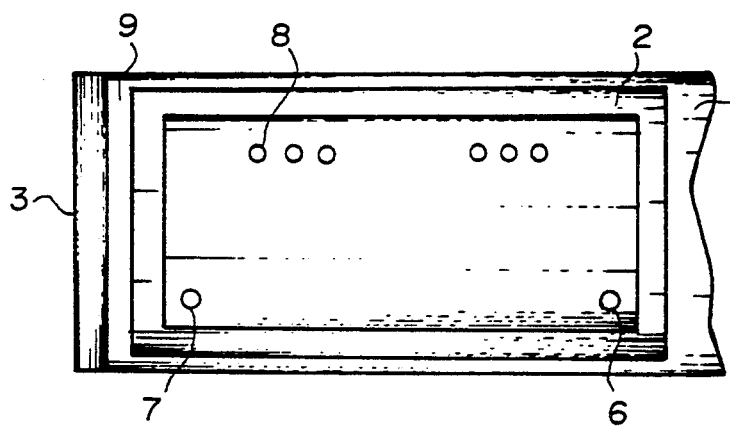
FIG. 2 is a top view of a conventional storage battery as used with an embodiment of the present invention.

Additionally, although a conventional storage battery has been illustrated in FIGS. 1 and 2, the battery mat is also useful in conjunction with the so called "maintenance-free" batteries wherein ports 8 are permanently covered. Although maintenance-free, such batteries are not trouble free, and are subject to the same surface acid condensation problems suffered by conventional wet cell storage batteries. Thus, since "maintenance-free" batteries nonetheless leak acid, the battery mat of the present invention is likewise suitably employed in combination therewith in order to prevent acid induced corrosion.

The holder for use in conjunction with the battery and battery mat is essentially a support means for the battery having a support surface with one or more planar faces and can be of any known or conventional type. Examples of the holder include platforms, trays, and stands. The holder can be made of metal, wood, plastic, ceramic material, or a composite. The support surface can be a continuous flat planar surface, optionally having one or more undulations, or a semi-continuous surface such as a screen or mesh. Holder 3, as mentioned above, illustrates a continuous flat planar support surface in the form of a tray; a tray meaning that one or more edges have been turned upwardly. Additionally, the battery holder may also include a fixing means for maintaining the battery's position relative to the holder and include those means that are known or conventional in the art. Examples of fixing means include clamping or bolting a lower portion of the battery exterior to the support surface of the holder as well as strapping the top surface of the battery to the support surface of the holder. Thus, conventional automobile battery holders are specifically and preferably contemplated for use in the present invention.

FIG. 2 shows a top view of a conventional battery resting on the battery mat 2 and battery holder 3. As shown there, the battery mat 2 extends beyond each of the bottom edges of the battery 1 so as to receive any acid traveling from the top surface of the battery 1 and progressing down the sidewalls toward the support surface 9.

Figure 3:
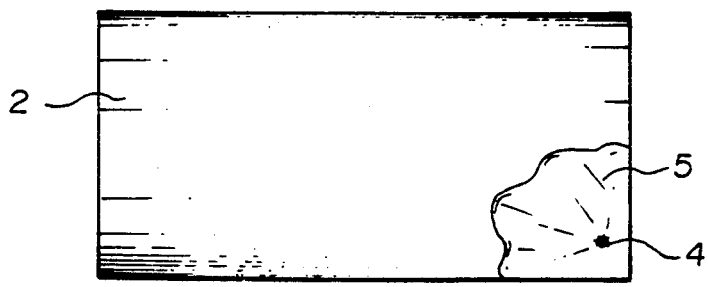
FIG. 3 shows a pattern of acid migration in a preferred embodiment of the present invention.

As shown in FIG. 3, as the acid encounters the mat at an area 4, it diffuses and expands through the mat in a multi-directional pattern 5 until it encounters a sufficient amount of the alkaline substance and is completely neutralized. Thus, even though the acid may only leak from only one side of the battery, the entire amount of acid neutralizer may be used in combatting the corrosive effects of the acid.

The acid-neutralizing battery mat is comprised of a sheet of needled polypropylene felt having an alkaline substance and a polymer binder impregnated therein. The needled polypropylene felt used as the base sheet in the present invention is particularly well suited for use as a battery mat. Specifically, the felt allows for good absorption and diffusion of the battery acid. Further, the felt is readily impregnated with a sufficient amount of alkaline compound and binder so as to be able to neutralize large amounts of escaped acid. Finally, because the felt is unaffected by battery acid, unlike conventional wool felt or polyethylene felt, the mat can serve as a physical acid barrier long after the neutralizing alkaline compound has been used up.

The felt can be any desired thickness depending in part upon the space available in the intended battery holder, and upon the amount of alkaline compound desired to be contained therein; thicker felt providing for greater amounts of alkaline compound. In general the thickness ranges from 0.0625 to 1.0 inches, preferably 0.125 to 0.375 inches.

Additionally, the needled polypropylene felt is preferably egg-shelled, by conventional heat-treating means as is well known in the art, on one side in order to increase the rigidity of the mat. The felt material, egg-shelled or not, is per se known and commercially available (i.e. American Felt & Filter Company, Westerly, R.I.).

The alkaline substance used in the present invention is normally a carbonate or bicarbonate of an alkali metal, although any known alkaline chemical compound or composition that is suitable for neutralizing battery acid and which can be impregnated into the needled polypropylene felt can be used. Preferably the alkaline compound is sodium carbonate or sodium bicarbonate. The amount of alkaline compound varies depending upon the intended use. However, normally the greatest amount that can be conveniently impregnated into the felt is employed.

The polymer binder for use in the present invention can be any polymer that functions to bind or hold the alkaline substance in the polypropylene felt and still allow the acid to enter the mat. Such polymers should be capable of being impregnated into the polypropylene felt in latex form and are preferably those polymers that are employed in latex paint, latex wall board primer and sealer compositions, .and non-woven binder compositions. In addition, natural and synthetic rubbers can also be used as the polymer binder.

Particularly preferred binders, however, are acrylic polymers. Acrylics bind very well to the polypropylene felt, thus trapping and holding the alkaline substances. Moreover, acrylics tend to reject moisture and hence preserve the efficacy of the alkaline substance, while still allowing the battery acid to penetrate and disperse into the battery mat. Suitable acrylic binders are commercially available in latex form and include Wall-Grip 1, 2, and 3 (Benjamin-Moore, Montvale, N.J.), VYN-L-PRYME, and Lux-Ree L/F (Athey Paint Co., Baltimore, MD), and Hycar (B. F. Goodrich, Cleveland, OH).

The battery mat may also contain a dye or pigment in order to provide a desired color for any particular application.

The battery mat is prepared, in general, by immersing needled polypropylene felt into a treatment solution in order to impregnate the felt and then drying the treated felt. The polypropylene felt may, optionally, be released from a compressed state just prior to contacting the treatment solution in order to more rapidly and more uniformly impregnate the felt.

The treatment solution, which comprises a latex of a polymer binder, an alkaline substance, and, optionally, a colorant, is generally prepared by diluting a polymer latex with water so as to have a solids content of about 5 to 55% by weight. The alkaline substance is then added to the diluted latex in an amount of about 0.1 lbs/gal up to t he solubility limit, and is generally added in amounts of 0.2 to 0.5 lbs/gal. The colorant is then optionally added in an amount of about 0.1 to 1.0 oz/gal. It should be noted that the treating solution components can be combined in any order, including simultaneously.

The impregnating step can be preferably carried out using a treatment tank equipped with a submerged spray bar. The spray bar operates to recycle and/or circulate the treatment solution by a pumping means, which takes in the treatment solution and jets it out through the spray bar. The use of the spray bar aids in both maintaining the uniformity of the treatment solution and in preventing the precipitation of the alkaline substance from the solution. Additionally, by bringing the needled polypropylene felt into close proximity with the spray bar, a faster and more uniform impregnation of the felt can be achieved. Specifically, the jetted solution leaving the spray bar can be used to "pressure treat" or otherwise force the treatment solution into the felt. The felt can be brought into such proximity with the spray bar by any conventional means such as guide rollers.

Figure 4:
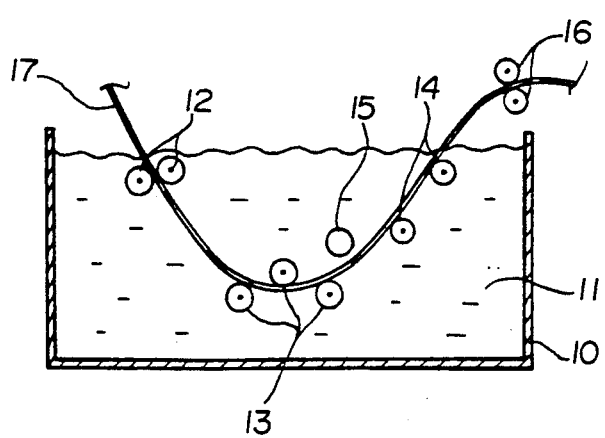
FIG. 4 shows a treatment tank for producing an acid neutralizing battery mat.

An example of such a preferred treatment tank is illustrated in FIG. 4. The tank 10 contains treatment liquid 11 for impregnating the long strip of needled polypropylene felt 17. The felt 17 is guided by rollers 12 and 13 underneath and in close proximity to the spray bar 15. Guide rollers 14 direct the felt strip out of the treatment solution.

During the impregnating step, the temperature of the treatment solution can range from room temperature up to 185° F., but is preferably 100°–150° F., and more preferably 120°–140° F. These elevated temperatures serve to prevent the precipitation of the alkaline substance from the treatment solution, increase the uptake of the optional colorant into the felt, and render the felt more workable.

The duration of the impregnating step varies depending upon the thickness of the felt, the composition and temperature of the treatment solution and desired amount of alkaline substance to be incorporated into the felt. Generally, the residence time of a piece of felt in the treatment solution is in the range of from 0.3 to 10 minutes, preferably 30 to 120 seconds.

After contact with the treatment solution, the impregnated polypropylene felt is preferably contacted with ringers 16 in order to remove the excess treating solution before being subjected to drying step.

The drying step may be carried out by any known technique and includes drying at room temperature as well as under forced hot air drying conditions. Typically the drying will be carried out by subjecting the treated polypropylene felt to hot air having a temperature between about 150°–250° F., and is preferably about 200° F. The drying time need only be sufficient to expel the water from the felt and to cure the polymer latex. The actual drying time will depend on the drying temperature and the thickness of the felt and usually ranges from 1 to 60 minutes.

Once dried the impregnated needled polypropylene felt will weigh between 2–5 times its original weight; preferably about 3 times its original weight.

The dried and impregnated needled polypropylene felt is then cut into the desired size and shape, thereby producing the battery mat of the present invention.

EXAMPLE

A treatment solution was prepared by combining for every 4 gallons of water, 1 gallon of Wall-Grip 2, 2 lbs. of sodium bicarbonate and approximately 3 oz. of a yellow dye. The solution was mixed and added to a treatment solution tank which contained a submerged spray bar located near the bottom of the tank which recycled the treatment solution. The treatment solution was heated to 130° F.

A 7 ft. by 3 ft. ×¼ in. ribbon of needled polypropylene felt, which was previously egg-shelled on one side, was immersed into the treatment solution, brought underneath the spray bar, and removed from the tank via rollers. The residence time of the felt in the treatment solution was about 40 seconds.

After the felt was removed from the treatment solution, the excess solution was rung out by means of conventional ringers. The treated felt was then dried at 200° F. for 2.5 minutes. The drying cured the latex and sealed the alkaline substance within the felt. The impregnated and coated felt material weighed almost 3 times more than the original, untreated felt.

The impregnated and coated felt material was then cut into approximately 12 in. ×8 in. mats, thereby forming the battery mat of the present invention.

Although the invention has been shown in connection with certain specific embodiments, it will be readily apparent to those skilled in the art that various changes in form and arrangement of parts may be made to suit requirements without departing from the spirit and scope of the invention.

What we claim:

1. An acid-neutralizing battery mat for placement underneath a battery; comprising:
a sheet of needled polypropylene felt impregnated with an alkaline substance and a polymer binder.

2. The battery mat as recited in claim 1, wherein said polymer binder is an acrylic polymer.

3. The battery mat as recited in claim 1, wherein said alkaline substance is selected from the group consisting of carbonates and bicarbonates of alkali metals.

4. The battery mat as recited in claim 3, wherein said alkaline substance is selected from the group consisting of sodium carbonate and sodium bicarbonate 5. The battery mat as recited in claim 1, wherein said sheet is further impregnated with a dye.

6. An acid-neutralizing battery holder, comprising:
a wet-cell storage battery having a top surface, sidewalls and a bottom surface;
means for holding said battery comprising a support surface subjacent to said bottom surface of said battery; and
an acid-neutralizing mat interposed between said support surface and said bottom surface of said battery;
wherein said mat comprises:
a sheet or needled polypropylene felt impregnated with an alkaline substance and a polymer binder;
said mat being of sufficient length and width so as to extend a pre-determined distance beyond at least one of said sidewalls of said battery.

7. The battery holder as recited in claim 6, wherein said predetermined distance is at least 0.125 inches.

8. The battery holder as recited in claim 7, wherein said mat extends said predetermined distance beyond each sidewall of said battery.

9. The battery holder as recited in claim 6, wherein said alkaline substance is selected from the group consisting of carbonates and bicarbonates of alkali metals.

10. A method for making an acid-neutralizing battery mat, comprising:
treating a strip of needled polypropylene felt by immersing the felt into a treatment solution which comprises a polymer latex and an alkaline substance selected from the group consisting of carbonates and bicarbonates of alkali metals; and
drying the treated felt until the water has been expelled and the polymer has been cured.

11. The battery mat as recited in claim 2, wherein said acrylic polymer binder is a cured acrylic latex.

12. The battery holder as recited in claim 6, wherein said polymer binder is an acrylic polymer.

13. The battery holder as recited in claim 9, wherein said polymer binder is an acrylic polymer.

14. The battery holder as recited in claim 13, wherein said acrylic polymer binder is a cured acrylic latex.

15. The battery mat as recited in claim 1, wherein said needled polypropylene felt has been egg-shelled on one side thereof.

16. The battery mat as recited in claim 1, wherein said needled polypropylene felt has a thickness in the range of 0.125 to 0.375 inches.

17. The battery holder as recited in claim 6, wherein said needled polypropylene felt has been egg-shelled on one side thereof.

18. The battery holder as recited in claim 6, wherein said needled polypropylene felt has a thickness in the range of 0.125 to 0.375 inches.

19. The method according to claim 10, wherein said treatment solution has a temperature between 120°-140° F.

* * * * *